United States Patent [19]
Burke et al.

[11] Patent Number: 5,887,054
[45] Date of Patent: *Mar. 23, 1999

[54] PLAY AND PLUG TELEPHONE SYSTEM

[75] Inventors: Edmund Thomas Burke, West Long Branch; Benjamin Wilson Day, Jr., Rumson; Timothy Ian Ross, Fair Haven, all of N.J.

[73] Assignee: Lucent Technologies Inc., Murray Hill, N.J.

[*] Notice: The term of this patent shall not extend beyond the expiration date of Pat. No. 5,883,944.

[21] Appl. No.: 808,228

[22] Filed: Feb. 28, 1997

[51] Int. Cl.⁶ .................................................. H04M 1/00
[52] U.S. Cl. ...................... 379/159; 379/158; 379/161; 379/164
[58] Field of Search .................. 379/159, 156, 379/161, 162, 164, 167, 171, 183, 157, 160, 217, 218, 226, 201

[56] References Cited

U.S. PATENT DOCUMENTS

| | | | |
|---|---|---|---|
| 3,708,629 | 1/1973 | First | 379/167 |
| 3,767,859 | 10/1973 | Doering et al. | 379/167 |
| 4,291,199 | 9/1981 | Densmore et al. | 379/161 |
| 4,523,307 | 6/1985 | Brown et al. | 370/30 |
| 4,706,244 | 11/1987 | Watson et al. | 379/160 |
| 4,757,496 | 7/1988 | Bartholet et al. | 370/85 |
| 4,791,662 | 12/1988 | Ahnen et al. | 379/165 |
| 4,807,225 | 2/1989 | Fitch | 370/71 |
| 4,821,319 | 4/1989 | Middleton et al. | 379/159 |
| 4,850,011 | 7/1989 | Delmege et al. | 379/157 |
| 4,893,334 | 1/1990 | Parnello | 379/157 |
| 4,907,259 | 3/1990 | Frech | 379/161 |
| 5,027,345 | 6/1991 | Littlewood et al. | 370/166 |
| 5,090,052 | 2/1992 | Nakajima et al. | 379/160 |
| 5,341,415 | 8/1994 | Baran | 379/120 |
| 5,388,095 | 2/1995 | Seraj | 379/156 |
| 5,530,951 | 6/1996 | Argintar | 379/164 |
| 5,596,631 | 1/1997 | Chen | 379/160 |
| 5,600,654 | 2/1997 | Brown et al. | 379/157 |
| 5,699,419 | 12/1997 | Ardon | 379/156 |
| 5,717,747 | 2/1998 | Boyle, III | 379/201 |
| 5,754,637 | 5/1998 | Choi | 379/167 |
| 5,787,115 | 7/1998 | Turnbull et al. | 375/222 |

*Primary Examiner*—Curtis A. Kuntz
*Assistant Examiner*—Rexford N Barnie
*Attorney, Agent, or Firm*—Joseph J. Opalach

[57] ABSTRACT

A distributed processing telephone system for providing "plug-and-play" capability. In particular, a key telephone system comprises a plurality of telephone sets. Each telephone set is coupled to a least one common communications channel, or telephone line, and includes at least one tunable RF modem. There is no key service unit (KSU). That is, the system is KSU-less. Resources of the telephone system are allocated using a peer-to-peer protocol. For example, as each telephone set is newly added to the system, the new telephone set adaptively determines its own allocation of resources, e.g., intercom numbers, etc. During operation, each telephone set requests the appropriate resources from its peers.

8 Claims, 10 Drawing Sheets

PORTION OF SET 100

CHANNEL - FREQUENCY TABLE
PLL PROGRAMMING DATA VS RF CHANNEL (ALL FREQUENCIES IN Mhz)

| # CH | FREQUENCY | RECEIVE COUNTER | | VFILTER | TRANSMIT COUNTER | |
|---|---|---|---|---|---|---|
| | | DECIMAL | HEX | (Vdc) | DECIMAL | HEX |
| 1 | 0.40 | 2219 | 8AB | .64 | 1968 | 7B0 |
| 2 | 0.44 | 2227 | 8B3 | .89 | 1960 | 7A8 |
| 3 | 0.48 | 2235 | 8BB | 1.15 | 1952 | 7A0 |
| 4 | 0.52 | 2243 | 8C3 | 1.40 | 1944 | 795 |
| 5 | 0.56 | 2251 | 8CB | 1.65 | 1935 | 790 |
| 6 | 0.60 | 2259 | 8D3 | 1.91 | 1928 | 788 |
| 7 | 0.64 | 2267 | 8DB | 2.18 | 1820 | 780 |
| 8 | 0.68 | 2275 | 8E3 | 2.42 | 1912 | 778 |
| 9 | 0.72 | 2283 | 8EB | 2.87 | 1904 | 78F |
| 10 | 0.76 | 2291 | 8F3 | 2.93 | 1895 | 768 |
| 11 | 0.80 | 2299 | 8FB | 3.18 | 1888 | 75F |
| 12 | 0.84 | 2307 | 903 | 3.44 | 1880 | 758 |
| 13 | 0.88 | 2315 | 90B | 3.89 | 1872 | 74F |
| 14 | 0.92 | 2323 | 913 | 3.95 | 1884 | 748 |
| 15 | 0.96 | 2331 | 91B | 4.20 | 1856 | 73F |
| 16 | 1.00 | 2339 | 923 | 4.45 | 1848 | 738 |
| 17 | 1.04 | 2347 | 92B | 4.71 | 1840 | 72F |
| 18 | 1.08 | 2355 | 933 | 4.98 | 1832 | 728 |
| 19 | 1.12 | 2363 | 93B | 5.22 | 1824 | 71F |
| 20 | 1.16 | 2371 | 943 | 5.47 | 1816 | 718 |
| 21 | 1.20 | 2379 | 94B | 5.73 | 1808 | 70F |
| 22 | 1.24 | 2387 | 953 | 5.98 | 1800 | 708 |
| 23 | 1.28 | 2395 | 95B | 6.24 | 1792 | 6FF |
| 24 | 1.32 | 2403 | 963 | 6.49 | 1784 | 6F8 |
| 25 | 1.36 | 2411 | 96B | 6.75 | 1778 | 6EF |
| 26 | 1.40 | 2419 | 973 | 7.00 | 1768 | 6E8 |

FIG. 10

TIMING TABLE

| QUANTITY | SYMBOL | MINIMUM | MAXIMUM | ASSUMED VALUE |
|---|---|---|---|---|
| MESSAGE FRAME SYNCHRONIZING PULSE | MFS | 1.7ms | 3ms | 2ms |
| MAXIMUM NUMBER OF SYSTEM ENDPOINTS | M | | | 32 |
| ENDPOINT NUMBER | n | 1 | M | |
| TIME TO START OF MESSAGE SLOTS | Tfs | | | 2ms |
| TIME TO START OF MESSAGE | Tms | | | Tfs+n*Tst |
| SLOT TIME | Tst | | | 400μs |
| TIME TO START OF NAK SLOTS | Tns | | | 2ms |
| NAK FRAME INTERVAL | Tna | | | Tns+M*Tst+Tne |
| NAK SLOT PERIOD | Tnp | | | M*Tst |
| NAK FRAME END INTERVAL | Tne | | | 2ms |
| MESSAGE FRAME END INTERVAL | Tfe | | | 2ms |
| MESSAGE FRAME INTERVAL | Tmi | | | MFS+Tfs+M*Tst+Tfe |

FIG. 11

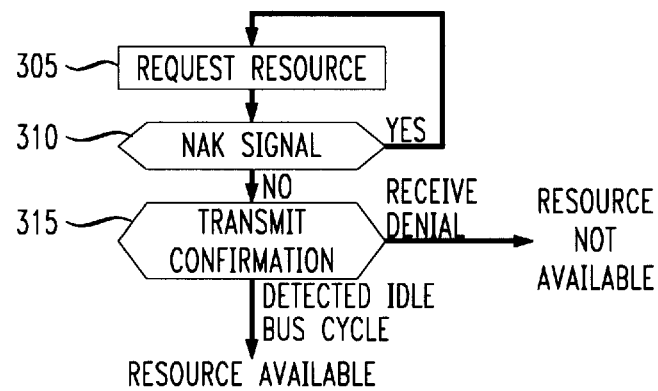

NOTES:
1. SOM [START-OF-MESSAGE] IS AT LEAST 2 ms OF MARKING SIGNAL AND EOM [END-OF-MESSAGE] IS 2 ms OF MARKING TO ASSURE CHARACTER INTEGRITY
2. ALL START-STOP CHARACTERS BEGIN WITH A 1 TO 0 TRANSITION OF SIGNAL TO RESTART A BIT SAMPLING CLOCK (START BIT) AND END WITH A 1 (STOP BIT)
3. CRC IS 2 OCTETS OF CRC-16 EMBEDDED IN START-STOP CHARACTERS
4. ONLY L3 OCTETS ARE EXCHANGED WITH THE MESSAGE LAYER

| | ADDRESS RANGE | |
|---|---|---|
| BROADCAST | 11111111 | (1) |
| RESERVED | 11110000 - 11111110 | (15) |
| RESERVED | 10000000 - 11101111 | (112) |
| RESERVED | 01110001 - 01111111 | (15) |
| UTA-I | 01110000 | (1) |
| RESERVED | 01100000 - 01101111 | (16) |
| RESERVED | 01000000 - 01011111 | (31) |
| START UP NUMBER | 01000000 | (1) |
| RESERVED | 00110010 - 00111111 | (14) |
| UTA-II | 00110000 - 00110001 | (2) |
| RESERVED | 00100000 - 00101111 | (16) |
| RESERVED | 00001101 - 00011111 | (19) |
| STATIONS | 00000001 - 00001100 | (12) |
| RESERVED | 00000000 | (1) |

# 5,887,054

PLAY AND PLUG TELEPHONE SYSTEM

CROSS-REFERENCE TO RELATED APPLICATIONS

Related subject matter is disclosed in the co-pending, commonly assigned, U.S. patent applications of Burke et al., entitled "A Plug and Play Telephone System," Ser. No. 08/808,229, filed on Feb. 28, 1997; Apgar et al., entitled "A Plug and Play Telephone System," Ser. No. 08/808,233, filed on Feb. 28, 1997; and Hui et al., entitled "A Plug and Play Telephone System," Ser. No. 08/808,227, filed on Feb. 28, 1997.

FIELD OF THE INVENTION

This invention relates generally to communications, more particularly, to telephone systems.

BACKGROUND OF THE INVENTION

Telephone systems come in a variety of "sizes." Although the term "size" in the context of a telephone system can have many definitions, one way to gauge the "size" of a telephone system is to identify the number of telephone lines and/or telephone sets that the system can support. For example, there are versions of the "DEFINITY®" PBX (available from Lucent Technologies Inc.) that support thousands of lines and/or thousands of telephone sets. Similarly, at the other end of the spectrum, there are telephone systems, such as the PARTNER® Communications System (available from Lucent Technologies Inc.) that provide cost effective telecommunications solutions in which only a single telephone line and a few telephone sets are required.

However, regardless of size, one characteristic of a telephone system remains unchanged. There is always a central control point. In large systems, this may be a computer comprising a number of circuit boards for a central processing unit, memory, etc. Such a computer provides a telecommunications-specific operating system for allocating system resources and controlling communications. On the other hand, in small systems, this central control point may be provided by a telephone set designated as a "master" or "key system unit" (KSU). This KSU controls other satellite telephone sets in the system. As such, when additional equipment is added to the system, this additional equipment is "administered" in some fashion by the KSU.

An example of a system having a "master unit" is described in U.S. Pat. No. 4,807,225, issued Feb. 21, 1989 to Fitch and entitled "Telephone Line Carrier System." It should be noted that this system provides a telephone apparatus that creates additional communication channels (via radio-frequency (RF) channels) at a business or residential premises and is compatible with existing telephone extensions that share a common wire-pair.

Alternatively, U.S. Pat. No. 4,757,496, issued Jul. 12, 1988 to Bartholet et al. and entitled "Distributed Telephone System" describes a telephone system without a central control point where each telephone set is coupled to a coaxial cable via a control unit. Unfortunately, this system still requires either a fixed administration, or manual programming, to set some system parameters such as telephone set addresses.

SUMMARY OF THE INVENTION

A telephone system which provides "plug-and-play" capability. The telephone system comprises a plurality of communication endpoints, each endpoint interacting with the others so that each endpoint automatically configures itself.

In an embodiment of the invention, a key telephone system comprises a plurality of telephone sets. Each telephone set is coupled to a least one common communications channel, or telephone line, and includes at least one tunable RF modem.. There is no key service unit. That is, the system is KSU-less. Resources of the telephone system are allocated using a peer-to-peer protocol. As each telephone set is newly added to the system, the new telephone set adaptively determines its own allocation of resources, e.g., intercom numbers, etc. During operation, each telephone set requests the appropriate resources from its peers.

BRIEF DESCRIPTION OF THE DRAWING

FIG. 10 shows an illustrative table of timing values for a message access frame;

FIG. 11 shows an illustrative resource allocation method;

DETAILED DESCRIPTION

Figure 1:
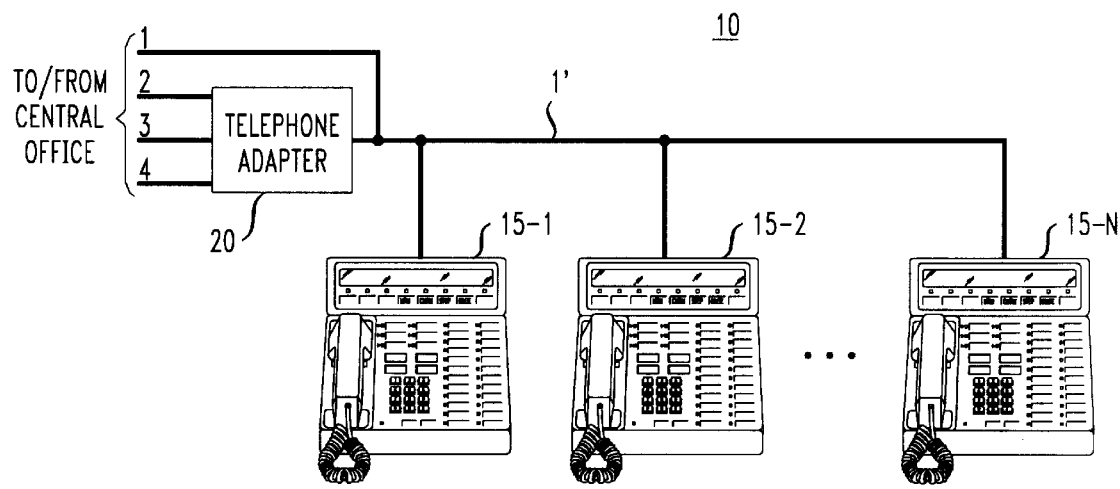
FIG. 1 shows a block diagram of an illustrative telephone system embodying the principles of the invention.

An illustrative telephone system embodying the principles of the invention is shown in FIG. 1. Telephone system 10 comprises a telephone adapter 20 and a plurality of telephone "station" sets 15-1 through 15-N. Telephone adapter 20 is coupled to a number of telephone "lines." Lines 1, 2, 3, and 4 are wire pairs representative of facilities provided by a local central office (not shown). For example, each line is a loop-start line as known in the art. Line 1', also a wire pair, couples telephone adapter 20 to each of the plurality of N stations. In this context, N=12 and telephone system 10 represents a 4×12 system (4 lines by 12 stations). For the purposes of this description, each station is assumed to be identical in terms of design. As such, only one station, an illustrative station 100, is described in detail below.

Figure 2:
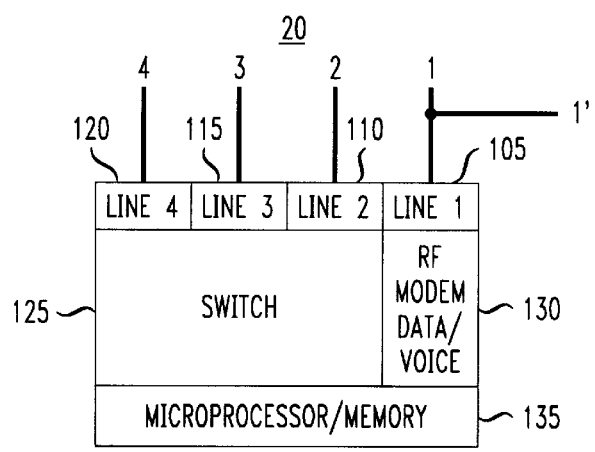
FIG. 2 shows a functional-level block diagram of an illustrative telephone adjunct embodying the principles of the invention.
Figure 3:
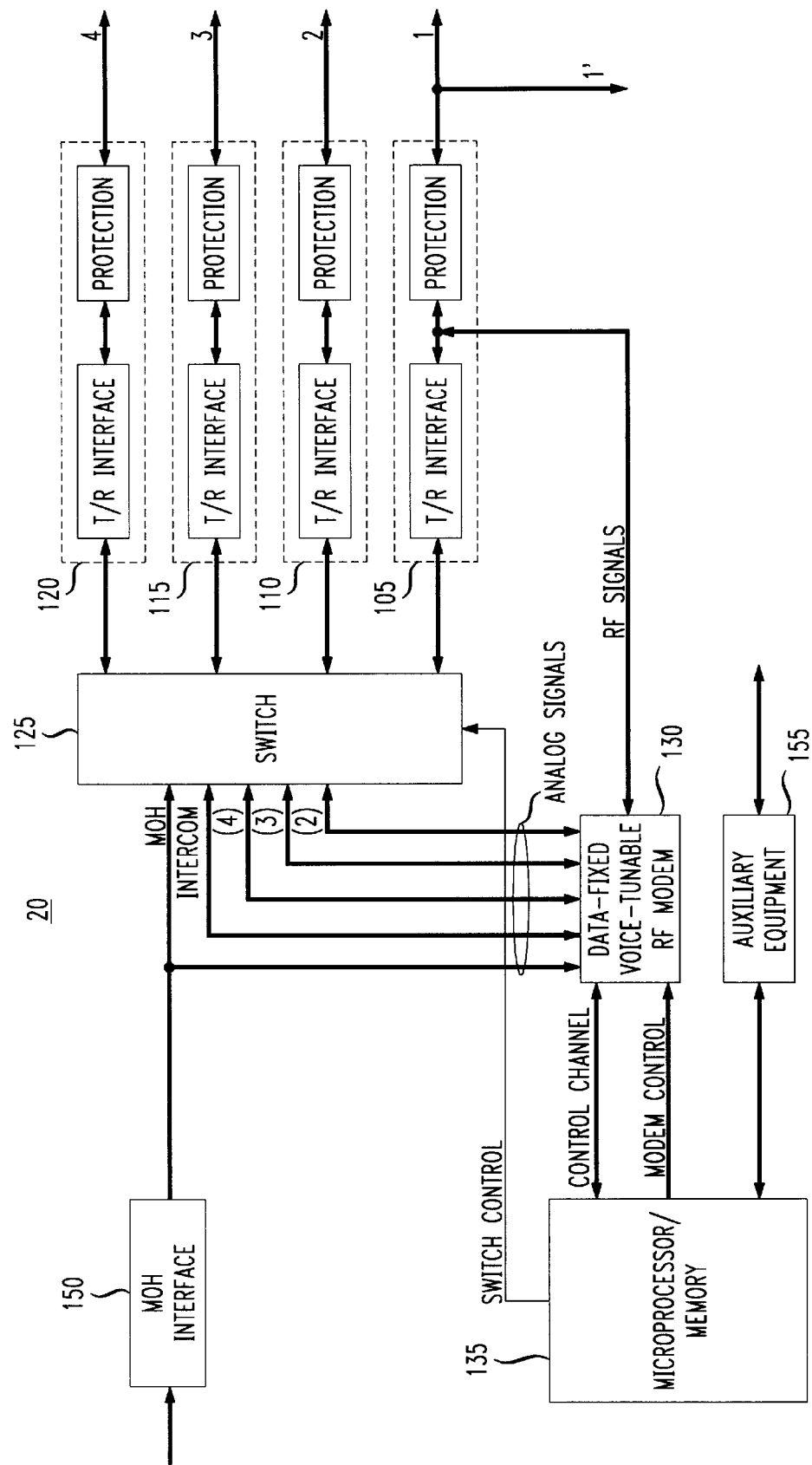
FIG. 3 shows a circuit-level block diagram of an illustrative telephone adjunct embodying the principles of the invention.

An illustrative functional block diagram of telephone adapter 20 is shown in FIG. 2. As used herein, telephone adapter 20 is representative of "adjunct" equipment. Telephone adapter 20 comprises four line interface units: 105, 110, 115, and 120; a switch 125, radio-frequency (RF) modem 130, and microprocessor/memory 135. A circuit-oriented block diagram is shown in FIG. 3. Like-elements have the same numbers. The only additional elements shown in FIG. 3 are Music-on-Hold (MOH) Interface 150 for coupling to industry-standard MOH sources and auxiliary equipment interface 155 for coupling to an external paging system, door-phone, or other industry-standard auxiliary equipment. Other than the inventive concept, the elements are well-known and will not be described in detail. For example, microprocessor/memory 135 is representative of a stored-program-control processor with associated memory for storing associated programs and data. Each of the four line interface units terminates a single pair of wires as known in the art comprising protection and Tip/Ring (TR) Interface circuitry. Switch 125 provides coupling between lines 2, 3, and 4, and RF modem 130. The latter is a bank of N modems. (Illustratively, N=7.) One RF modem transmits and receives messages over a fixed "data channel" or "control channel" (described below) for transmission on line 1'. The remaining RF modems frequency modulate signals appearing on lines 2, 3, and 4, and signals from MOH source 150 to respective "voice channels" (described below) for transmission on line 1'. Similarly, in the reverse direction, modulated signals appearing on these channels, and received from line 1', are demodulated and provided to the appropriate endpoints such as lines 2, 3, and 4. Each voice channel RF modem is tunable via modem control signaling from the microprocessor (described below). The "prime" notation on line 1 is used to highlight the fact that this line additionally carries frequency multiplexed signaling provided by telephone system 10. One advantage of telephone adapter 20 is the ability to provide multi-line service in a home environment without having to incur the expense of re-wiring the home to support additional lines. (Although these RF frequencies obviously propagate back to the central office (not shown), they are within industry-defined standards).

Figure 4:
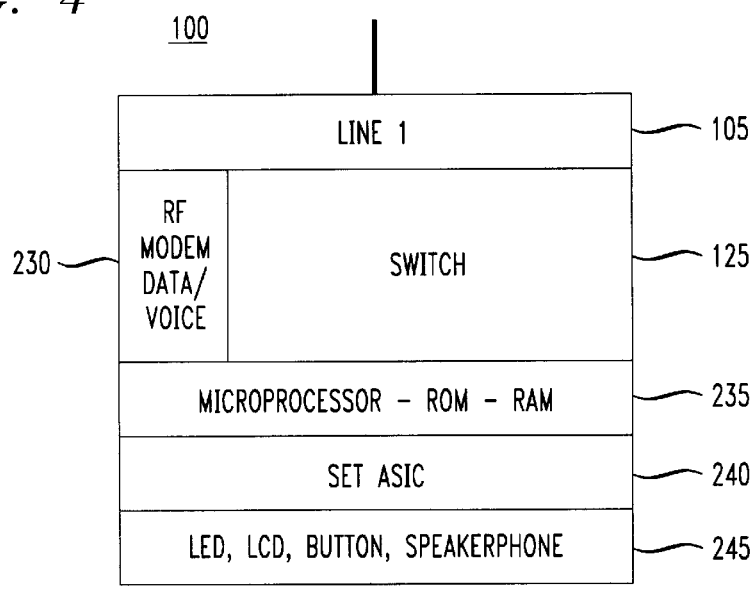
FIG. 4 shows a functional-level block diagram of an illustrative telephone station set embodying the principles of the invention.
Figure 5:
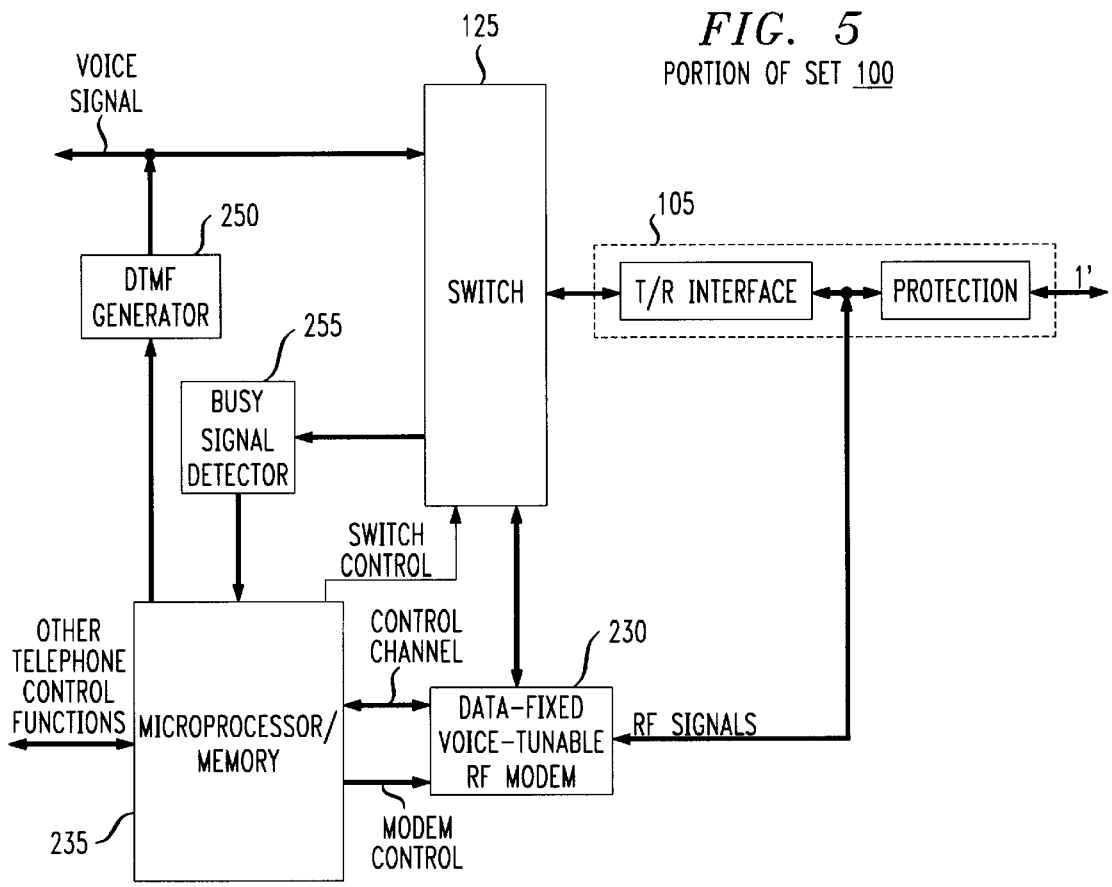
FIG. 5 shows a circuit-level block diagram of an illustrative telephone station set embodying the principles of the invention.

An Illustrative functional block diagram of a portion of station 100, which embodies the principles of the invention, is shown in FIG. 4. Other portions of station 100 are not shown, such as the keypad, handset, power supply, etc., (elements, and the interconnection of such, which are known in the art). Like-elements to those in FIGS. 2 and 3 have the same numbers. Station 100 comprises one line interface unit 105; a switch 125; RF modem 230; microprocessor/memory 235; station "application-specific-integrated circuit" (ASIC) 240; and other standard telephone functions 245 for controlling such items as LED, LCD, Button, Speakerphone control, etc. A circuit-oriented block diagram is also shown in FIG. 5. Other than the inventive concept, the elements are well-known and will not be described in detail. Again, like-elements have the same numbers. The only additional elements shown in FIG. 5 are dual-tone-multi-frequency (DTMF) generator 250 and busy signal detector 255. In this instance, RF modem 230 represents a fixed modem for the control channel and a tunable modem (both described below). It should be noted that each tunable modem provides two independent voice channels—one for transmission and one for reception.

Figures 6, 7:
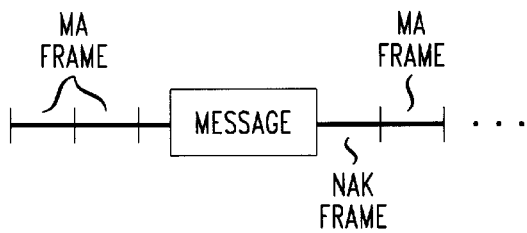
FIG. 6 shows an illustrative table of channel assignments for use in the telephone system of FIG. 1.
FIG. 7 shows an overview of a communications format for use in the telephone system of FIG. 1.

As noted above, line 1' conveys frequency multiplexed signaling. Illustratively, the data, or control, channel is in a frequency band between 270 Khz and 400 Khz, e.g., at 320 Khz. It is on this channel that stations and adjuncts communicate using a peer-to-peer protocol (described below). For the voice channels, a table of illustrative voice channel assignments is shown in FIG. 6. Any N of the 26 listed channels can be selected. As shown, the 26 channels span a frequency range from 270 Khz (Thousands of Hertz) to 2 Mhz (Millions of Hertz). For the purposes of this description, it is assumed that N=17. (It should be noted that N is not limited to 26. Since this illustrative embodiment uses only 17 voice channels, 26 possible voice channels were provided for reference purposes only.) The 17 selected channels are stored in the microprocessor/memory portion of each station and adjunct. (Since the modems are tunable and the channels are "software" defined, it should be noted that it is possible to add additional frequencies if necessary. In other words, the channels frequency assignments although defined in a software sense are not cast in concrete.) These 17 channels represent a "resource pool" of voice channels. Use of a particular channel is requested through the above-mentioned data channel. Once use of a voice channel is approved, the microprocessor sets the RF modem to the corresponding frequency via modem control signaling shown in FIG. 4 (described below).

The RF modems comprise off-the-shelf technology. The control channel modem is fixed-frequency RF modem at a frequency of, e.g., 320 Khz. The tunable RF modems (or in the case of telephone adjunct 20, the bank of tunable RF modems) are each, e.g., a Motorola 13111 Universal Cordless Telephone Subscriber IC. The Rx Counter and Tx Counter columns in FIG. 6 represent the counter settings to adjust the receiver and transmitter respectively. The receiver and transmitter settings are independent of each other. For example, the receiver can be set to use channel 1 while the transmitter is set to use channel 19. Or, latter on, the receiver can be set to use channel 1, etc. Similarly, the receiver and transmitter could be set to the same channel. A master oscillator (not shown) provides a clock signal at 10.24 Mhz. In addition, in front of each receiver is a passive filter (not shown). The latter is a tunable front end to cut down on interference and intermodulation components. Illustratively, this passive filter is based on a "varacter cap" as known in the art. (Varacter caps are used in many applications such as digitally synthesized transceivers.) In tuning the receiver portion of an RF modem, not only is a counter value supplied, but a voltage level is applied, as indicated in FIG. 6 (VFILT column), to the passive filter (not shown).

Subsequent to initialization, each endpoint (station or adjunct) performs a test to evaluate the relative noise performance of each of the 17 voice channels. This test is performed as follows. Each endpoint requests use of one of the 17 voice channels (described below). Upon confirmation that it may use the requested channel (described below), the endpoint tunes both the receiver and transmitter portions of its RF modem to the channel and measures the background noise (using techniques known in the art). Results of the noise test are stored by the microprocessor in the memory. In this fashion, a noise test is performed for each one of the 17 voice channels. The microprocessor then forms a "quality table" by rank ordering the 17 voice channels from best to worst (bear in mind that even though the term "worst" is used, this is relative to the noise performance of the other 16 channels and, as such, the noise environment of the 17th channel may by more than acceptable in terms of performance). During operation, when a voice channel is needed, the endpoint attempts to first use the most recently used voice channel. If this is not possible, e.g., by denial of another endpoint, the next best channel from the quality table is requested for use, and so on. It should be noted that each endpoint maintains its own "quality" table and, as such, the table stored within each endpoint may be different.

In accordance with the principles of the invention, the elements shown in FIG. 1, i.e., stations 15-1 to 15-N and telephone adapter 20 communicate using a "peer-to-peer" protocol over the control channel. In other words, there is no centralized processing or control point. Each telephone and/or adjunct comprises its own call processing software. As described further below, telephone system 10 is self-configurable, meaning that each station and/or adjunct "bids" for use of a system resource. As a result, telephone system 10 provides plug-and-play functionality. Examples of system resources are: intercom number, voice channels, outside line access, etc.

The protocol defined herein follows the ISO model for a layered protocol. Layer 1 defines the basic functions for the physical transmission medium, layer 2 specifies a link layer, and layer 3 specifies high level format, messages, and procedures. For the purposes of the following description, protocol operation is implemented by the microprocessor/memory portion of each endpoint.

The control channel is used by all endpoints for exchanging messages and supports 4800 bits per second (bps). (It is assumed that transmission distances are short enough that a transmitted signal appears everywhere on the system nearly simultaneously. Distances of less than 1000 feet result in delays of less than approximately 2 micro-seconds ($\mu s$). Signaling element intervals of greater than 200 $\mu s$ makes this a plausible assumption.) Messages are sent as an RF carrier signal frequency modulated (FM) with binary data. One endpoint at a time transmits messages over the control channel while all other endpoints receive, or listen, to the transmission.

An overview of the communications format is shown in FIG. 7. This communications format comprises Message Access (MA) Frames, MESSAGE Frames, and Negative Acknowledgment (NAK) Frames. Initially, it is assumed no messages are being transmitted. In this idle state, a sequence of MA Frames are transmitted on the control channel. It is within each MA frame that a MESSAGE Frame can start. After a MESSAGE frame, a NAK frame occurs followed again by one or more MA frames.

Figure 8:
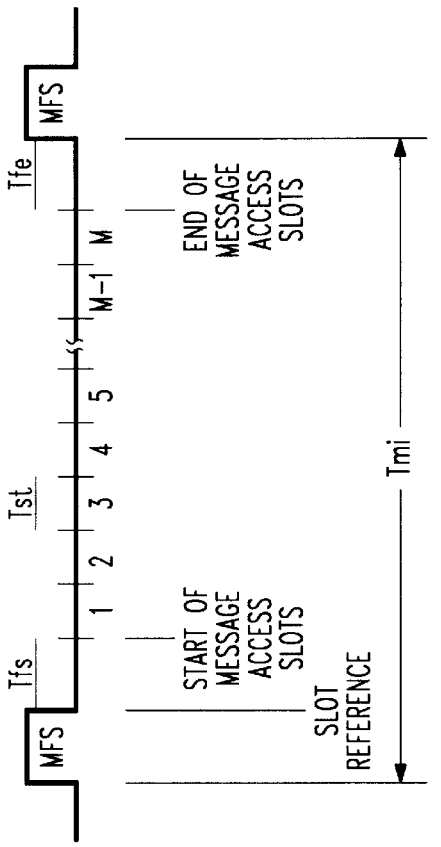
FIG. 8 shows an illustrative message access frame format.

For layer 1, the following scheme ensures that only one transmitter is on at a time during normal operation and also provides reasonable recovery from abnormal conditions. An illustrative MA frame is shown in FIG. 8. The waveform shown in FIG. 8 represents the carrier signal. Carrier-on is represented by the higher level. A message frame synchronizing (MFS) pulse indicates the start of an MA frame to all system endpoints. The MFS pulse is simply a burst of signal carrier. (In a similar fashion, other carrier signal bursts (described below) are used to signal the start of a message access frame and provide negative acknowledgments (NAKs).)

The MFS pulse is followed by M message access slots. The first message access slot occurring a period of time, Tfs, after the falling edge of the MFS pulse. All endpoints synchronize timing of the message access slots to the falling edge of the MFS pulse. Each message access slot has a width, in time, of Tst. Each endpoint in the system (station, adjunct, etc.) is assigned a unique number (described below), which is associated with a corresponding one of the M message access slots. After the last message access slot, a period of time, Tfe, occurs before the next MFS pulse of the next MA frame.

The message access slots are used to regulate access to the control channel. In particular, an endpoint can only begin transmission of a message in its assigned message access slot if there is no carrier currently present in its assigned message access slot. (It is quicker to detect the presence of carrier than to detect the presence of an FM signal.) As such, an endpoint that has a lower message access slot number has higher priority for sending a message than endpoints with higher message access slot numbers. In this approach, it is important to realize that an actual message (described below) is longer than an MA frame. As such, if an endpoint transmits a message starting at its assigned time-slot, other lower priority endpoints will detect the presence of carrier in their message access slots and are prohibited from transmitting. (This eliminates the possibility of two endpoints using the same channel at the same time. If this occurred, signal "nulls" would occur on the channel thus giving the illusion to other endpoints that no transmission was occurring.)

Figure 9:
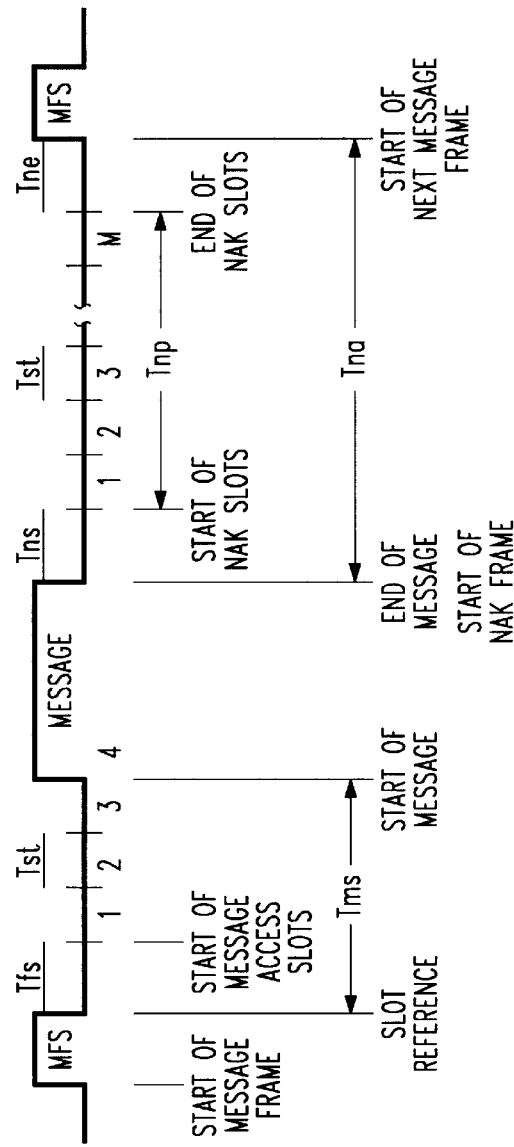
FIG. 9 shows an illustrative message transmission.

An illustrative message transmission is shown in FIG. 9. Assume message access slots correspond to endpoint numbers and all endpoints have unique endpoint numbers. (In this context, for a station, the MA slot numbers are associated with the station address, which is determined from the station intercom number.) Further, assume that Station 4 has a message to transmit and stations 1–3 do not. Station 4 begins to transmit in slot 4 because no carrier is present in that slot. (Had a station with a lower slot number begun transmitting, a carrier signal beginning before slot 4 would have prevented station 4 from transmitting.) Once a message has started other higher numbered endpoints on the system are prevented from transmitting during that MA frame. Received messages are processed as specified by the layer 2 and layer 3 actions (described below)

An end of message is indicated by a turn-off of the carrier signal by the transmitting endpoint. This turn-off of carrier also indicates the start of a NAK frame in which a NAK time-slot is assigned for each endpoint (similar to the message access time-slots described above). When a receiving endpoint detects an error in the message, this endpoint discards the message and inserts a burst of carrier into its assigned NAK time-slot, referred to as a NAK signal. All endpoints look for a NAK signal during these NAK time-slots, the totality of which is referred to as a NAK interval, Tnp. If any receiving endpoint detects a NAK signal in the NAK interval it discards the received message. Upon detection of a NAK signal, the endpoint that originated the message subsequently retransmits the original message.

Messages are classified into "high priority" and "low priority" (described below). High priority messages are transmitted in the first available MA frame. However, an endpoint can only transmit a low priority message if at least one idle MA frame has been detected. As a result, following a NAK frame, at least one idle MA frame must exist before transmission of a low priority message.

In this illustrative approach, all endpoints shared in establishing the start of message frames. In particular, an endpoint that transmits a message becomes responsible for transmitting the MFS pulses every MA frame until another endpoint sends a message. In this context, the first MFS pulse occurs immediately following the NAK frame. An illustrative set of timing values for a message access frame are shown in FIG. 10.

In the event that no MFS pulse occurs within the nominal expected time corrective action to restore the message frames is needed before another message can be transmitted. The circumstance of no MFS pulse generation can result from several causes such as power-down, disconnecting or failure of the generating endpoint, or initial power up of all endpoints on the system.

During startup or restoration, the system may have no MFS pulses. However, a simple time-out solution may result in multiple endpoints generating MFS pulses. As a result, start up or restoration of a message frame occurs only when an endpoint has a message to transmit that results from an activity unique to that endpoint so that only one MFS pulse is generated. This unique activity is defined as an endpoint being touched. For a station this is pressing a button or going off hook, or any other predefined activity. Similar definitions exist for an adjunct, e.g., line activity, etc. In other words, to reduce the probability of such a race condition, a station does not attempt to generate an MFS pulse until "touched."

In the event that an MFS pulse is received before the expected time due, perhaps, to interconnecting multiple working systems, the previous message frame is canceled and a new message frame started based on the time of the latest MFS pulse. Received carrier pulses that are shorter in duration than a minimal width MFS pulse are ignored and the current message frame resumed. It is possible for multiple endpoints to send congruent MFS pulses with the following consequences: 1) pulses reinforce, 2) pulses cancel, 3) some endpoints see MFS pulses, some see nothing or mutilated pulses. In any case the next endpoint that has a message to transmit assumes the role of a single MFS pulse generator either by transmitting a message in the current frame or first starting a new message frame then sending a message.

Layer 1 also provides a "transmit confirmation" to layer 3 to permit secure allocation of shared system resources. This is shown in FIG. 11, which is illustrative of a resource allocation method. A station first sends a message requesting a resource (e.g., access to line 2) in step 305. Assuming that no NAK signal is detected (which requires the retransmission of the message), the station waits for transmit confirmation in step 315. In particular, by definition, a "denial message" from another endpoint is classified as a high priority message. As described above, high priority messages are queued for transmission and transmitted as soon as possible. Consequently, if another endpoint denies the resource request, this high priority denial message is received by the requesting endpoint before an idle MA frame is detected. Therefore, transmit confirmation requires detection by the transmitting endpoint of an idle message frame following a resource request. Such an unused message frame indicates that all endpoints have had a chance to respond to the resource request. Thus, the lack of a denial by any peer is interpreted as a confirmation. (It should be observed that this overall approach to message transmission and resource approval improves system performance. For example, an endpoint with a low intercom number has a higher priority for transmitting a resource request just by virtue of the low intercom number. However, once it transmits, this endpoint is prohibited from transmitting another message until an idle frame is detected (baring a denial message), which will not occur until all other endpoints have had a chance to transmit their queued high priority messages.)

However, if a message is received denying the resource request, the station must either change the resource request, e.g., to a different line, or provide a suitable error message such as "no resource available at this time." (An error message can either be displayed to a user, or within the station, in any variety of ways, e.g., via an LCD, blinking lights, or the association of an error code.)

A burst of carrier received during a message access frame with duration greater than a maximum width MFS pulse is interpreted as a received message. The function of layer 2 is error free delivery of layer 3 messages. This requires the detection of any errors in messages induced by noise and/or distortion as a result of transmission over the control channel.

Figure 12:
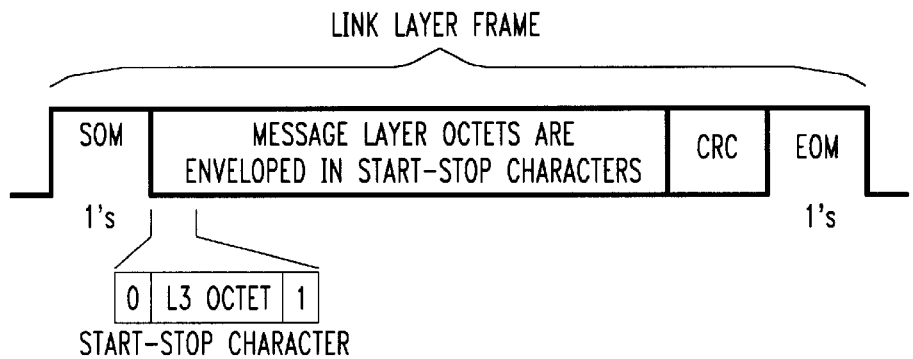
FIG. 12 shows an illustrative message format.

An illustrative format for a MESSAGE is shown in FIG. 12. A MESSAGE starts with a turn-on of carrier and a Start of Message (SOM) consisting of 2 milli-seconds (ms) of marking signals (1's). The received data signal is valid 200 $\mu$s after the turn-on of carrier. Following the SOM, is the message payload comprising a plurality of data octets. Each octet is enclosed within a start ("0") bit and a stop ("1") bit. An interval of up to 2 ms of marking signal can occur between characters. Following the data is a 16 bit cyclic-redundancy-check (16-CRC) sequence in two start-stop characters. The 16-CRC is used to detect data errors and is generated in accordance with the known American standard. After the 16-CRC is an "End-of-Message" (EOM) marking signal for 2 ms. The message ends with a turn-off of the carrier.

Counting a 16 bit CRC-16, a layer 2 message contains 6 characters minimum and 22 characters maximum. Thus, a valid message can range in duration from 16.5 ms to 91.8 ms. No layer 2 addressing is applied. Layer 2 messages are not sequenced but only one outstanding NAKed message exists from any given endpoint.

The timeliness with which certain messages are delivered will strongly influence the user perception of system response times, in particular messages associated with call processing should be delivered as quickly as possible. Messages identified as needing quick delivery are called high priority messages. All other messages are termed low priority messages.

For each type of message priority, Layer 2 transmits messages in the order that they are received from layer 3. All high priority messages are transmitted ahead of any low priority messages awaiting transmission. In particular, layer 2 transmits high priority messages in the next message frame available to that endpoint. However, low priority messages are transmitted in the next available frame after a vacant MA frame has occurred. If a vacant MA frame occurs and there is an attempt to transmit a low priority message but the message frame is used by another endpoint with a lower starting slot number, then another vacant frame must occur before the low priority message is transmitted.

If a negative acknowledgment (NAK) is received for a transmitted message, that message is retransmitted at the earliest opportunity. If no NAK is received the message is considered to have been transmitted successfully and the next message awaiting transmission is sent.

In terms of reception, a message is received correctly if no framing error or data error is detected and if no NAK signal from another endpoint is detected in the associated NAK frame. Layer 2 passes correctly received messages to layer 3 in the order in which they are received.

If an error is detected in the start-stop format of any received message character or in the received CRC value the receiving endpoint generates a NAK signal in the corresponding NAK slot during the upcoming NAK frame.

Figure 13:
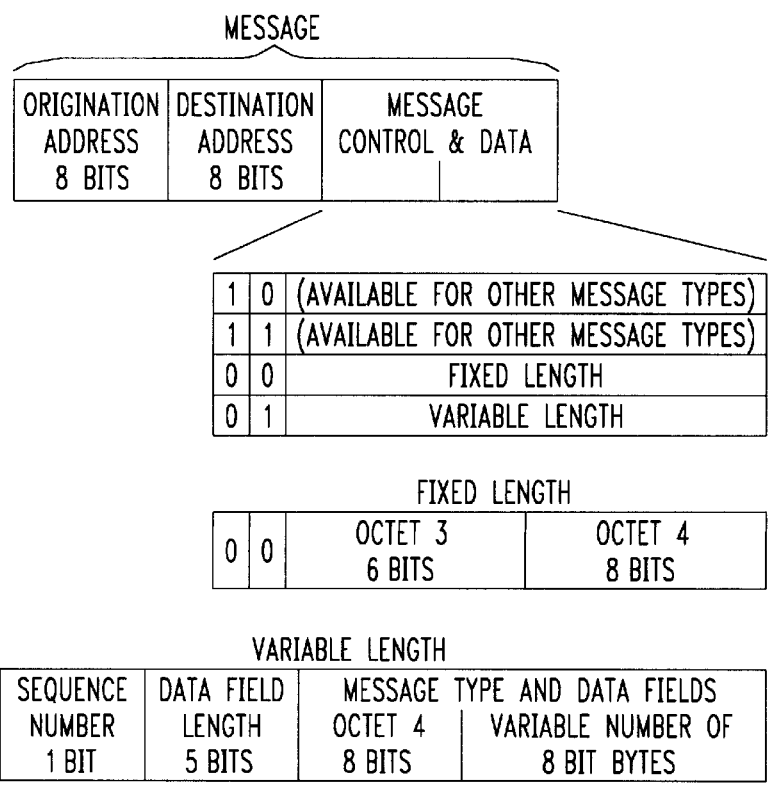
FIG. 13 shows an illustrative format for the data-bearing portion of the message shown in FIG. 12.

For the above-mentioned payload portion, an illustrative format is shown in FIG. 13. The payload portion comprises 3 fields: an 8 bit origination address, an 8 bit destination address, and a message control and data field. The latter field comprises either fixed-length message control and data information or variable length message control and data information. The first two bits of the message control and data information identify the type of information, e.g., whether fixed or variable, or special message(s). Fixed length messages are used for allocation of system resources, e.g., Facility Request, Intercom Assignment, Voice Channel Request, Facility Status, Intercom call, Mute Control, Message Waiting Indicator, Run Diagnostic Test, Denial. Illustratively, fixed length messages are associated with high priority messages. Variable length messages are e.g., Update Time, Update Date, Caller ID Name, Caller ID Digits, Dial Feature Codes. Illustratively, variable length messages are low priority messages.

Figures 14, 15:
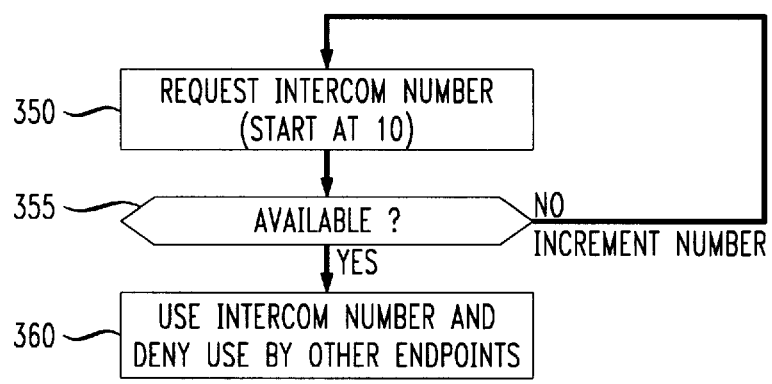
FIG. 14 shows an illustrative address space for the endpoints of the telephone system of FIG. 1.
FIG. 15 shows an illustrative method for automatic configuration of intercom numbers.

In terms of addresses, an illustrative address space is shown in FIG. 14. As shown in FIG. 14, stations have addresses from 1 to 12. The term "UTA-I" refers to an adjunct of the type represented by telephone adapter 20 in FIG. 1. The term "UTA-II" refers to an adjunct of the type shown in FIG. 19 (described below). Also, it should be noted that one address is identified as "broadcast," i.e., the message is meant for all endpoints.

The Protocol must behave in predictable manner under all possible power up conditions and endpoint connection arrangements. Four startup conditions are defined for this system: hot start, warm start, cold start, and frigid start. Message frames must be generated before communication can begin. This occurs when a button is pressed or change in switchhook state occurs at any station. Thus startup and recover operate in the same way with respect to frame generation.

The following higher layer considerations are included here for information purposes. Endpoints require a unique endpoint number in order to know in which message frame access slot to begin message transmission. A frigid start is a "factory fresh" like condition with no previously assigned station number. Herein, the station seeks a station, or intercom, number until a vacant number is found, then taking that number. This process is initiated at a station after a frigid start by a button press or change in switchhook state. To discover the vacant station number a start up number is used that corresponds to the highest station number and last MA frame slot position. Once a station number is acquired, that number is held in nonvolatile RAM until the station is reset to the factory fresh condition or another station number is manually programmed. A type of adjunct, such as telephone adapter 20 in FIG. 1, has a permanently assigned endpoint number so that it can begin initializing immediately after a frigid start. As such, although a system may have more than one type of adjunct, only one of each type of adjunct exists in this addressing scheme (of course, this requirement can be altered by simply increasing the address space available for each type of adjunct). As described herein, the intercom, or station, number translates into the address space shown in FIG. 14. In particular, intercom numbers 10 to 21 are mapped into addresses 1–12.

As described above, the peer-to-peer protocol of telephone system 10 provides a vehicle for each endpoint to not only share information but also share and allocate resources. Overall, each endpoint generally remains silent on the control channel until a stimulus occurs, e.g., start-up, off-hook, incoming call, etc. In response to the stimulus, the affected endpoint requests the appropriate resources and/or provides the appropriate information via the control channel. In terms of information, the control channel provides an ability for each endpoint to query other endpoints as to overall system configuration (described further below). In terms of system resources, these resources are typically common to all but owned by none. As noted above, examples of system resources are: intercom number, voice channels, outside line access, etc.

The following are some illustrative examples of the operation of telephone system 10. As noted above, upon start-up, each telephone and/or adjunct goes through an automatic configuration process so that they are fully operational. This process includes assigning intercom numbers to all of the extensions, determining how many lines are connected to the system, assigning lines to the corresponding line buttons, determining if the lines are touch-tone or rotary, and searching for quiet RF channels (the above-mentioned quality table generation). (Determination of touch-tone or rotary involves a) detecting if dial-tone is present, b) outpulsing a DTMF digit, and c) if dial-tone is broken, then it is touch-tone, else, the line is rotary.)

In the context of the telephone system of FIG. 1, available extension numbers are presumed to be 10 through 21 (twelve numbers, one for each possible station). An illustrative method for use in an endpoint for determining an extension number is shown in FIG. 15. In step 350, a station initially requests the use of intercom #10 using the above-described peer-to-peer protocol. If another station is already using intercom #10, then that station will reply with a denial message in step 315 and the station must increment the intercom # and try again. (Should all intercom numbers be used, a suitable error message is generated, e.g., on a display of the endpoint (not shown) such as "ERROR, too many phones.") However, if no station denies use of the intercom number, the station precedes to step 360 and presumes that intercom number is assigned to it. Any subsequent requests to use that this intercom number are denied by this station.

In a similar fashion, each endpoint checks to see how many lines are connected to each set. In terms of direct connections, this is simply a matter of testing the electrical characteristics of the lines via line interface units. Independent of this, additional checks are made via the control channel. For example, as mentioned above, telephone adapter 20 has a unique address. As a result, subsequent to determining the number of lines physically connected to a station, that station sends a message to telephone adapter 20 requesting configuration information, e.g., what lines are terminated on the telephone adapter. (Telephone adapter 20 detects the presence of dial tone to determine if a facility is present.) This configuration information is then used by the station to, e.g., enable the appropriate line appearance buttons on the station. In this system, it is presumed that all lines physically present in the system have line appearances at each station.

As another illustrative example of this telephone system, the situation of placing a call is described. An "off-hook" event triggers, e.g., station 15-1 to request an outside line. In this example, is assumed that four lines are physically present and that an available line is searched for in accordance with the known "idle line preference" feature, which simply defines the hunt order for an idle line. In performing this hunting sequence, station 15-1 first requests lines 1 through 4 from the other endpoints via the command channel. If line 1 is available, since this line is physically connected to all stations, initiation of a telephone call at this point occurs as in the prior art. However, if another line is requested and approved, station 15-1 must additionally request a pair of RF channels from the frequency pool, one for transmission and one for reception. (In terms of quickly enabling this type of connection, each station requests the last talk path, e.g., RF channel assignments, on the assumption that these may still be available. If the last talk path is not available, the next "best" channel is selected from that quality table of that station.) Upon allocation of a pair of RF channels, a message indicating such channels is sent to telephone adjunct 20, dial tone is provided to the user, and DTMF tones are transmitted to telephone adjunct 20 for initiation of a telephone call. In this context, telephone adjunct 20 associates the allocated RF frequencies with a particular line. (Alternatively, the station requests only one voice channel that it will use for transmission. The channel number is transmitted to telephone adjunct 20. The latter also requests a voice channel for transmission, the channel number of which is transmitted to the station. In this approach, both the telephone adjunct and the station each request a channel which form the transmit and receive pair for a conversation.)

An incoming call is handled in a similar fashion. If the call occurs on line 1, all stations respond to the detected ringing signal and establish the telephone call as in the prior art. If the incoming call is on lines 2, 3, or 4, telephone adjunct 20, responsive to the ringing signal, sends a ringing message to all of the stations. The stations, responsive to the ringing message cause visual and/or audible indications that a line is ringing. Telephone adjunct 20 requests allocations of a pair of voice channels and upon confirmation transmits the channel assignments to the stations. (Again, the allocation of the voice channels can be shared between telephone adjunct 20 and the answering station.)

It should be noted that the above-described telephone system supports a plurality of intercom calls between stations over the RF voice channels. (This is in contrast to prior art small key stations, where only one RF-based intercom call is supported.)

Other features are similarly enabled via the above-described control channel For example, access to particular lines at particular times could be controlled via privacy features. For example, upon establishing a telephone connection between station 15-1 of telephone system 10 and another telephone endpoint external to telephone system 10, any subsequent bridging onto this conversation can only be accomplished via the above-described request/denial process using the peer-to-peer protocol. Evoking privacy is as simple as depressing a feature button on station 15-1, which then subsequently denies any request by another station to bridge onto the existing telephone call.

Although the above-described system is self-configurable, telephone system 10 also provides for customization at each telephone for items such as: time/date, intercom number, memory speed dialing, line ringing options, display language. In some of these examples, specific resource requests are transmitted to the other endpoints which may, or may not, be denied, e.g., the request for a particular intercom number.

Additional functions are performed by telephone adapter 20. For example, telephone adapter 20 detects Caller ID information for all 4 lines. This information is detected at the point where the individual lines are connected to the adapter, and then the information is sent to other endpoints on the system through the control channel, making sure that the correct information is associated with each line. It is then up to the endpoints, e.g., stations, to make use of this information. Similarly, "Music-on-Hold" (MOH) is associated with a predefined intercom number (outside of the range of station intercom numbers) and is accessible via a predefined dialcode. This appears as a broadcast only endpoint over an RF channel.

Telephone adapter 20 also provides for outside line conferencing. For line 1, conferencing is performed as in the prior art. However, for lines 2, 3, or 4, telephone adapter 20 combines signals from the respective conference sources. For example, a call between, e.g., station 15-1 and an outside party on line 2 is established as described above. Now, assume that station 15-1 desires to add station 15-2 to the call. A conference, or bridging, button (not shown) is depressed on station 15-1 followed by dialing of the intercom number associated with station 15-1. This causes a request to telephone adapter 20 for an additional voice channel for station 15-2 to use during transmission. The transmit channel and receive channel information is sent to station 15-2 by telephone adapter 20 (the receive channel is the same channel currently in use by station 15-2). Now, telephone adapter 20 combines signals from the two channels used for transmission from stations 15-1 and 15-2 and provides this combined signal to line 2. Similarly, in the reverse direction, telephone adapter 20 combines signals from the outside line and stations 15-1 and 15-2 and provides the combined signal to the receive channel. Each set includes hybrid circuitry (not shown) as known in the art for canceling echo.

Figure 16:
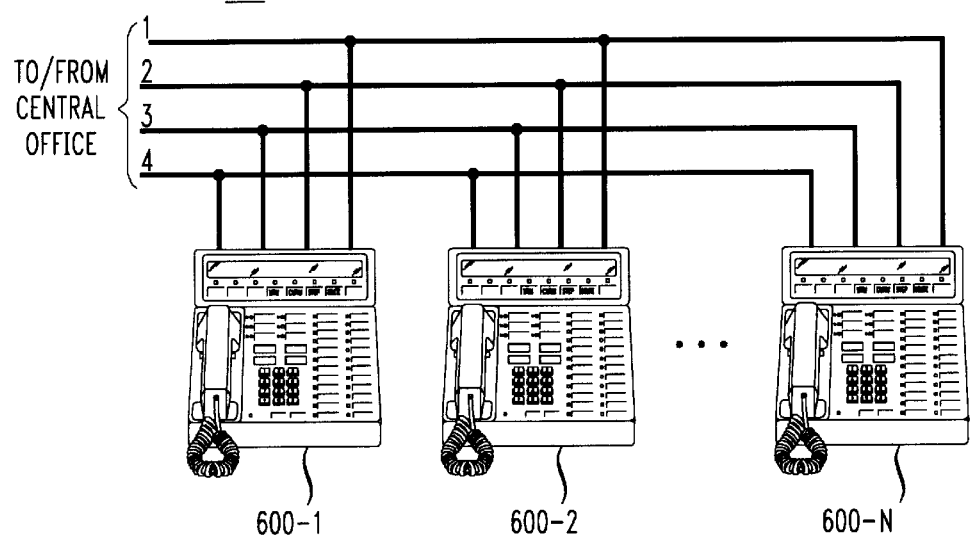
FIG. 16 shows another embodiment of a telephone system in accordance with the principles of the invention.
Figure 17:
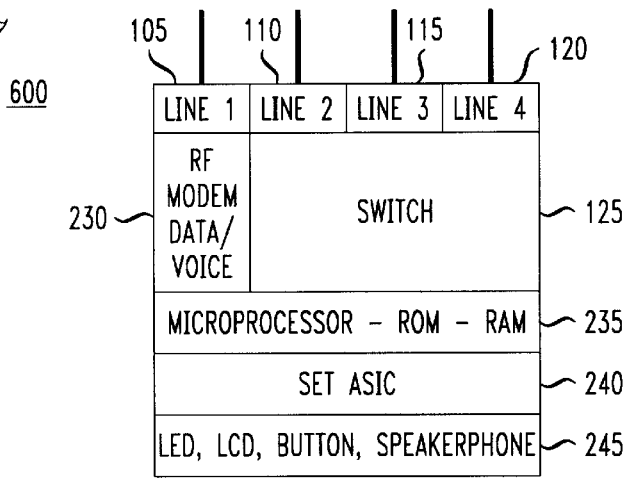
FIG. 17 shows another functional-level block diagram of an illustrative telephone station set embodying the principles of the invention.

Although in illustrative embodiment is shown in FIG. 1, a basic telephone system comprises two or more stations. An alternative station set embodying the principles of the invention is shown in FIG. 16. Here, each station has four line ports for coupling to a maximum of four loop-start central office lines. Of the four possible lines, one line is designated as the "line 1." All of the stations must be at least coupled to this line since this conveys the RF data channel. The remaining lines can be distributed to all or some of the stations in any fashion. An illustrative functional block diagram of a portion of a station 600 is shown in FIG. 17. This station is similar to the portion of station 100 shown in FIG. 4 except for additional line interface units 110, 115, and 120. In FIG. 16, all lines physically terminate on each station. As such, no allocation of voice RF channels is necessarily required for communicating over an outside line. However, requests of line availability to each endpoint are still made to ensure that an existing conversation is not interfered with and the RF channels are still available for intercom calls.

Figure 18:
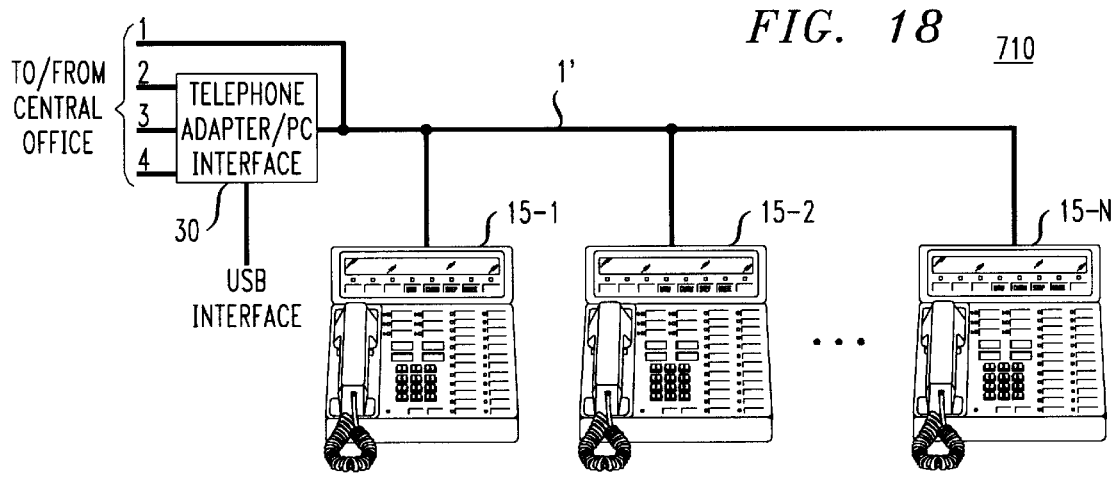
FIG. 18 shows another embodiment of a telephone system in accordance with the principles of the invention.
Figure 19:
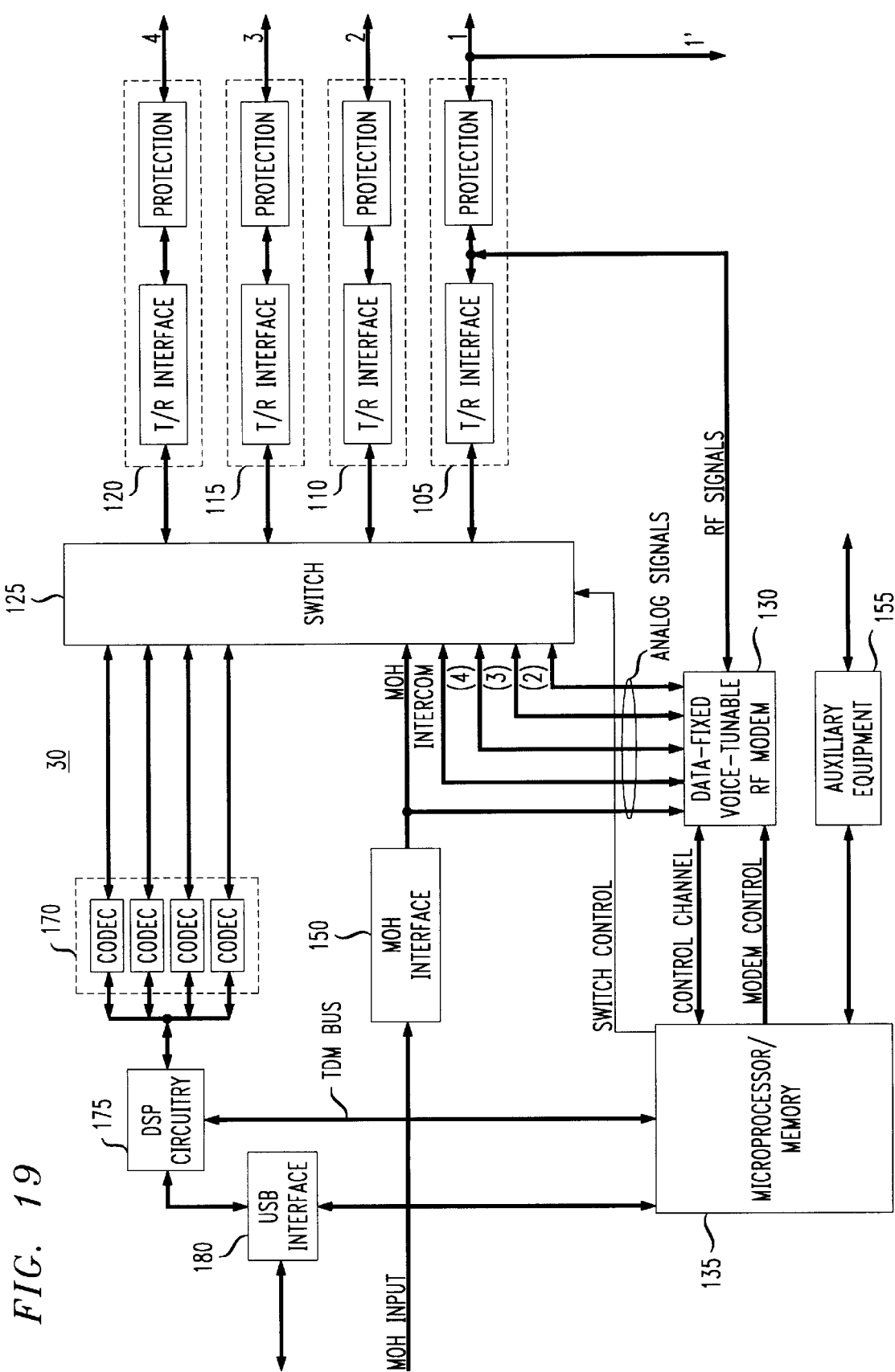
FIG. 19 is a circuit-level block diagram of telephone adapter/PC interface 30 shown in FIG. 18.

Another illustrative embodiment is shown in FIG. 18, which shows an adjunct represented by telephone adapter/PC interface 30. A circuit-level block diagram of this equipment is shown in FIG. 19. Telephone adapter/PC interface 30 is similar to telephone adapter 20 described above except for the addition of: codec bank 170, digital signal processing (DSP) circuitry 175, and universal serial bus (USB) interface 180. The latter conforms to the known industry standard for USB. The addition of a codec bank, DSP circuitry and USB interface, provide the ability to couple a personal computer (not shown) to the telephone system. In this fashion, the personal computer can similarly request information and allocation of resources. Each codec converts between analog and digital signaling. As a result, the personal computer can provide additional features such as automated attendant, voice mail, fax servers, etc., all within the umbrella of the inventive concept.

An additional advantage of requiring all stations be coupled to line 1 is that basic plain-old-telephone-service (POTS) can occur over line 1. For example, referring back to FIG. 1, should telephone adapter 20 fail or a power failure occur, each station can still originate and answer telephone calls via line 1.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was described in the context of a 4×12 key telephone system, the idea is extensible to larger sizes (e.g., PBX type, etc.) and different architectures (e.g., local-area-networks (LANs)). For example, a personal computer (PC) coupled to a LAN is suitably programmed and configured to provide telephone station functionality. Connection to, and from, the LAN allows the PC to dynamically plug into the network to provide telephony-type services in a peer-to-peer arrangement. Also, the concept is applicable to other forms of communications media besides single pair wiring such as quad wiring, coaxial cable, etc.

What is claimed:

1. An apparatus for providing communications, the apparatus comprising:

a telephone system adapted to provide plug-and-play capability wherein the telephone system comprises a plurality of communication endpoints, each endpoint interacting with the others so that each endpoint automatically configures itself and wherein at least one endpoint automatically configures itself to determine at least an address for use in communicating with the other endpoints.

2. A telephone system comprising:

a plurality of telephone sets, each telephone set coupled to a common communications channel such that each telephone set communicates with the other telephone sets in such a way as to allocate intercom numbers between them.

3. A telephone system comprising:

a plurality of telephone sets, each telephone set coupled to a common communications channel such that each telephone set communicates with the other telephone sets in such a way as to allocate addresses between them.

4. An improved method for administering a telephone system, the improvement comprising the steps of:

providing telephone sets that communicate with each other over a communications channel such that each telephone set administers itself wherein each telephone set administers itself by at least determining an address for itself for use over the communications channel.

5. An improved method for administering a telephone system, the improvement comprising the steps of:

providing telephone sets that communicate with each other over a communications channel such that each telephone set administers itself wherein each telephone set administers itself by at least determining an intercom number for itself.

6. A method for use in a telephone system, the method comprising the steps of:

coupling telephone sets together over a communications channel;

exchanging messages between the telephone sets over the communications channel for the purpose of allocating resources of the telephone system wherein the exchanging step comprises the steps of:
  each telephone set requesting use of a resource from the other telephone sets; and
  each telephone set using that resource if no other telephone set prohibits its use.

7. The method of claim 6 wherein the resource is an intercom number of the telephone system.

8. The method of claim 6 wherein the resource is an address for use over the communications channel.

* * * * *